(12) United States Patent
Burdeniuc

(10) Patent No.: US 10,472,459 B2
(45) Date of Patent: *Nov. 12, 2019

(54) POLYURETHANE CATALYSTS FROM A SULFUR BASED SALTS

(71) Applicant: EVONIK DEGUSSA GMBH, Essen (DE)

(72) Inventor: Juan Jesus Burdeniuc, Colmar, PA (US)

(73) Assignee: Evonik Degussa GmbH, Essen (DE)

( * ) Notice: Subject to any disclaimer, the term of this patent is extended or adjusted under 35 U.S.C. 154(b) by 135 days.

This patent is subject to a terminal disclaimer.

(21) Appl. No.: 14/881,544

(22) Filed: Oct. 13, 2015

(65) Prior Publication Data

US 2016/0102169 A1    Apr. 14, 2016

Related U.S. Application Data

(60) Provisional application No. 62/063,109, filed on Oct. 13, 2014.

(51) Int. Cl.

| | |
|---|---|
| *C08G 18/00* | (2006.01) |
| *C08G 18/06* | (2006.01) |
| *C08G 18/16* | (2006.01) |
| *C08G 18/76* | (2006.01) |
| *C08G 18/48* | (2006.01) |
| *C08G 18/22* | (2006.01) |
| *C08G 18/18* | (2006.01) |
| *C08G 18/63* | (2006.01) |
| *C08G 18/24* | (2006.01) |
| *C08G 18/54* | (2006.01) |
| *C08G 18/40* | (2006.01) |
| *C08G 18/42* | (2006.01) |
| *C08L 67/00* | (2006.01) |
| *C08G 101/00* | (2006.01) |
| *B01J 31/02* | (2006.01) |

(52) U.S. Cl.

CPC ....... *C08G 18/7621* (2013.01); *C08G 18/161* (2013.01); *C08G 18/163* (2013.01); *C08G 18/165* (2013.01); *C08G 18/166* (2013.01); *C08G 18/18* (2013.01); *C08G 18/1808* (2013.01); *C08G 18/1825* (2013.01); *C08G 18/1833* (2013.01); *C08G 18/1875* (2013.01); *C08G 18/225* (2013.01); *C08G 18/246* (2013.01); *C08G 18/4018* (2013.01); *C08G 18/4072* (2013.01); *C08G 18/42* (2013.01); *C08G 18/4208* (2013.01); *C08G 18/48* (2013.01); *C08G 18/4829* (2013.01); *C08G 18/546* (2013.01); *C08G 18/63* (2013.01); *C08G 18/633* (2013.01); *C08G 18/7664* (2013.01); *C08L 67/00* (2013.01); *B01J 31/0237* (2013.01); *B01J 31/0238* (2013.01); *B01J 31/0239* (2013.01); *C08G 2101/00* (2013.01); *C08G 2101/005* (2013.01); *C08G 2101/0008* (2013.01); *C08G 2101/0025* (2013.01)

(58) Field of Classification Search
CPC ................ C08G 18/7621; C08G 18/48; C08G 18/1875; C08G 18/16; B01J 31/0215
See application file for complete search history.

(56) References Cited

U.S. PATENT DOCUMENTS

| | | | | |
|---|---|---|---|---|
| 3,053,778 | A * | 9/1962 | Toone | .................... C08J 9/0066 521/120 |
| 4,394,491 | A | 6/1983 | Hoffman | |
| 4,757,105 | A | 7/1988 | Kopp et al. | |
| 5,902,835 | A * | 5/1999 | Meier | .................. C08G 18/163 521/125 |
| 6,051,527 | A * | 4/2000 | Savoca | .............. C08G 18/1825 502/167 |
| 8,367,870 | B2 | 2/2013 | Burdeniuc et al. | |
| 2007/0117902 | A1 * | 5/2007 | Origuchi | ............... C08F 283/00 524/457 |
| 2008/0281013 | A1 | 11/2008 | Nakamura et al. | |

FOREIGN PATENT DOCUMENTS

| | | |
|---|---|---|
| CN | 101323701 A | 12/2008 |
| CN | 101864671 A | 10/2010 |
| CN | 102351774 A | 2/2012 |
| EP | 1639020 A1 | 3/2006 |
| FR | 1301290 A | 8/1962 |
| GB | 871291 | 1/1961 |
| JP | 2005154599 A | 6/2005 |
| WO | 0158976 A1 | 8/2001 |
| WO | 03016372 A1 | 2/2003 |
| WO | 030163373 A1 | 2/2003 |
| WO | 03055930 A1 | 7/2003 |
| WO | 2004060956 A1 | 7/2004 |

(Continued)

*Primary Examiner* — Kara B Boyle
(74) *Attorney, Agent, or Firm* — Andrew H. Chung; Linda S. Li; Jason S. Ngui

(57) ABSTRACT

This invention discloses the use of sulfite salts as catalysts to make polyurethane polymers. In particular, this invention discloses the use of metal salts such as alkali metal salts as well as alkyl ammonium salts such as tetralkyl ammonium salts as catalysts to make polyurethane polymers. The sulfite salts are useful to make a wide variety of polyurethane polymers and polyurethane foam polymer products such as flexible polyurethane foam polymers, rigid foam polyurethane polymers, semi-rigid polyurethane polymer, microcellular polyurethane polymer, and spray foam polyurethane polymer as well as any polymeric material that requires the assistance of catalysts to promote the formation of urethane and urea bonds such as those found in polyurethane emulsions for paints, coatings, protective coatings, lacquer, etc as well as other polyurethane or polyurethane containing materials such as thermoplastic polymers, thermoplastic polyurethane polymers, elastomers, adhesives, sealants, etc. Examples of catalysts comprising the invention include sodium sulfite, potassium sulfite, lithium sulfite, tetramethylammonium sulfite and the like.

4 Claims, 4 Drawing Sheets

(56) References Cited

FOREIGN PATENT DOCUMENTS

| WO | 2006116456 A1 | 11/2006 |
| WO | 2008138482 A1 | 11/2008 |
| WO | 2014047230 A1 | 3/2014 |

* cited by examiner

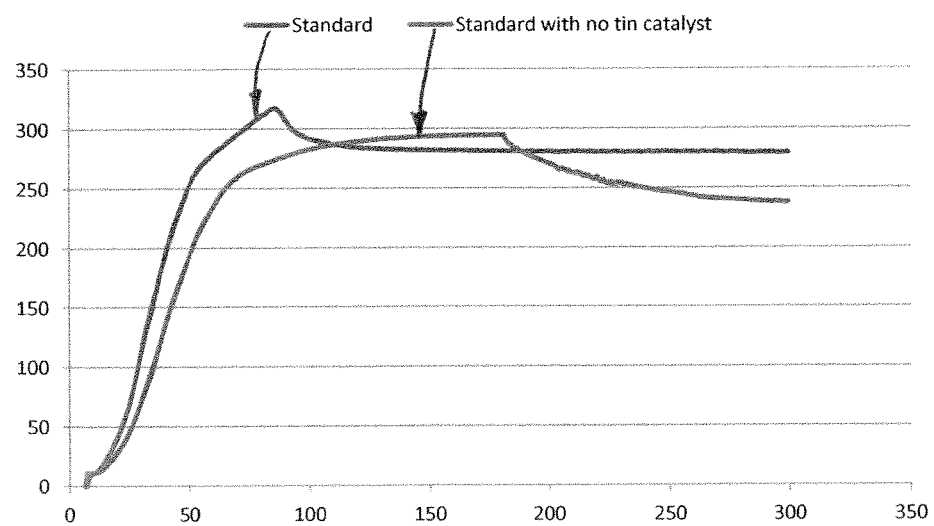
Fig. 1: Foam 1 using standard Dabco®T-9 catalyst and Foam 2 without Dabco®T-9 catalyst showing foam collapse
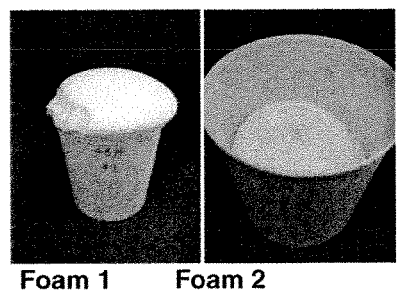
Fig. 2: Foam made with standard Dabco®T-9 catalysts (Foam 1) and foam made without standard Dabco®T-9 catalyst (Foam 2 collapsed)

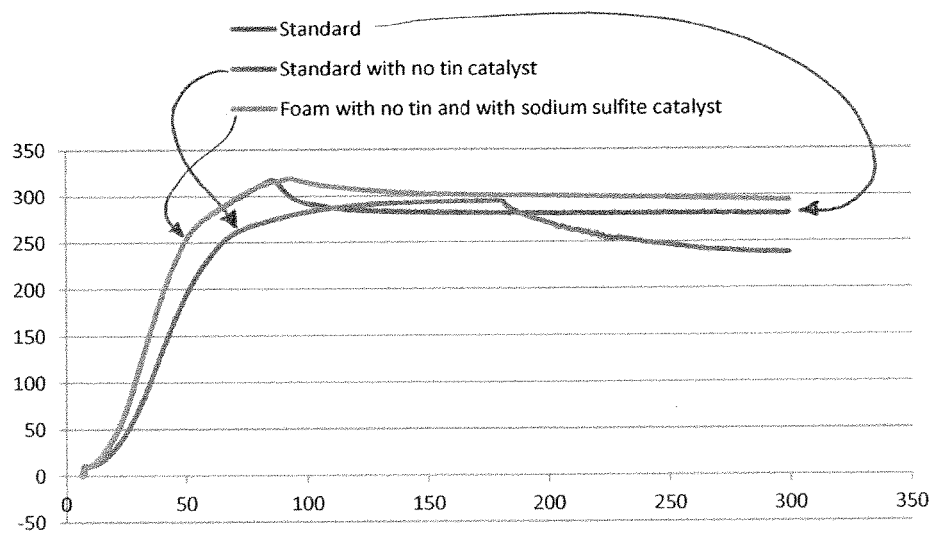

Fig. 3: Foam 1 using standard Dabco®T-9 catalyst, Foam 2 without Dabco®T-9 catalyst showing foam collapse and Foam 3 without Dabco®T-9 catalyst and with 0.16 pphp active sodium sulfite salt (1.06 pphp of 15% sodium sulfite solution in water).

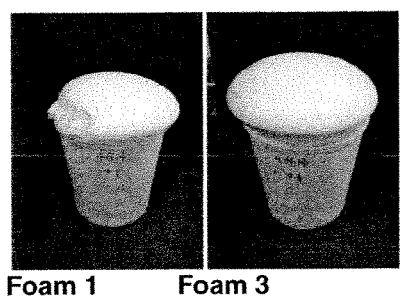

Fig. 4: Foam made with standard Dabco®T-9 catalysts (Foam 1) and foam made without Dabco®T-9 and with sodium sulfite catalyst (Foam 3) dissolved in water (15% aqueous solution)

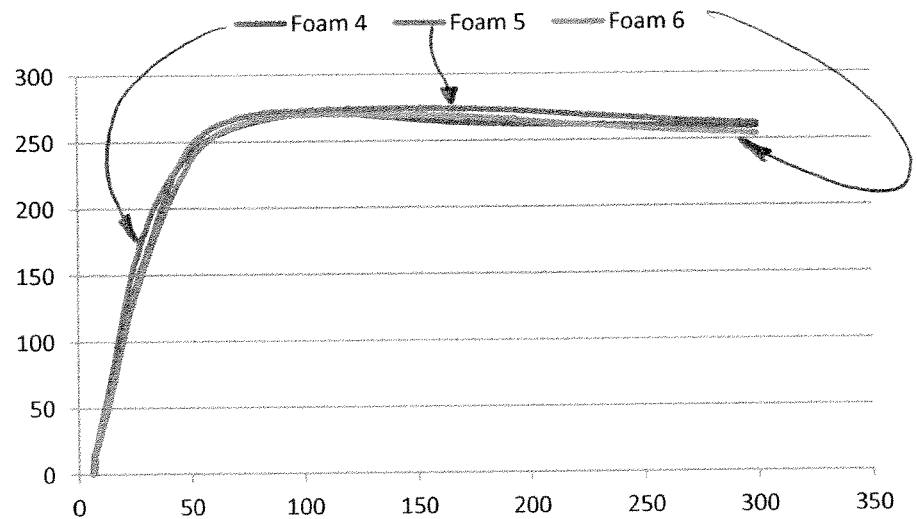
Fig. 5: Free rise profiles for TDI based foam made with convetional amine gelling catalysts (Dabco®NE1070) and potassium sulfite catalyst.
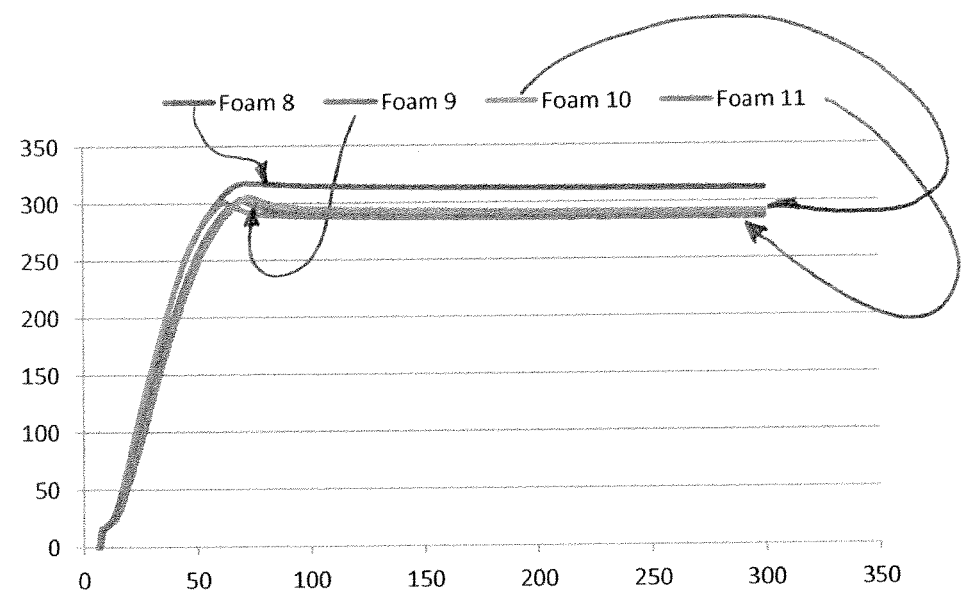
Fig. 6: Free rise profiles for MDI based foam made with convetional amine gelling catalysts (Dabco®NE1070) and potassium sulfite catalyst.

Figure 7: FOMAT Rate of Rise Profiles for Standard-1 and Potassium Sulfite Catalyst in the Presence of Various Phase Transfer Catalysts
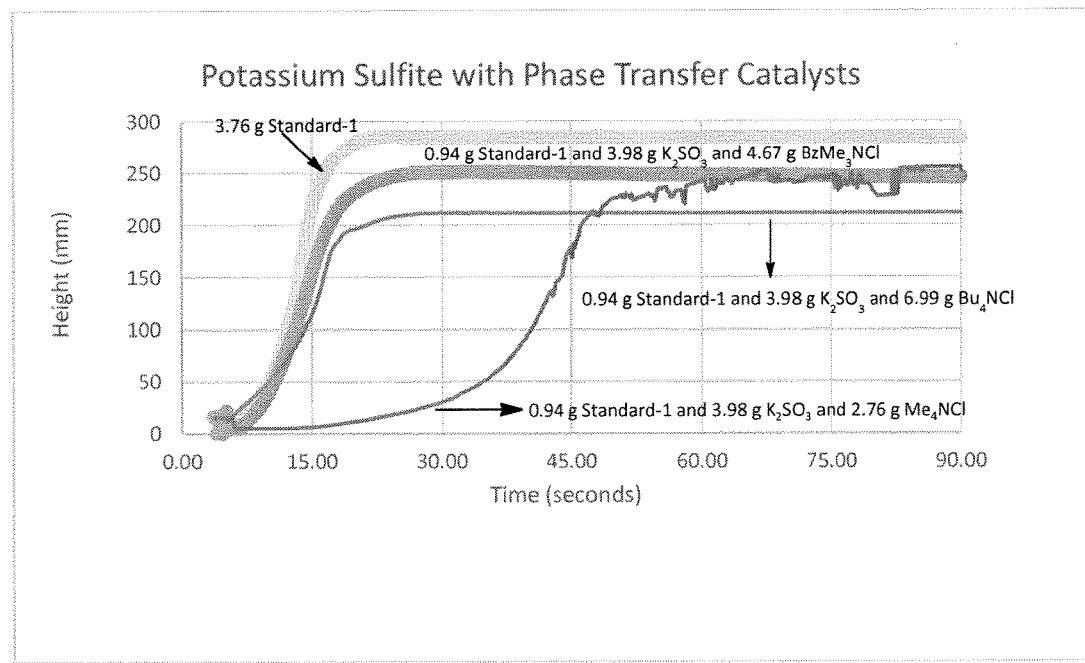

POLYURETHANE CATALYSTS FROM A SULFUR BASED SALTS

This application claims benefit of Application No. 62/063,109, filed on Oct. 13, 2014. The disclosure of Application No. 62/063,109 is hereby incorporated by reference.

FIELD OF THE INVENTION

The subject matter of this invention relates to sulfur based salts, catalyst containing those salts, methods for using the catalyst to make polyurethane foams and the resultant foams.

BACKGROUND OF THE INVENTION

WO2008138482A1 claims a process for making polyurethane polymer obtained when at least one polyol is reacted with a polyisocyanate in the presence of catalysts and in the presence of at least a sulfurous compound selected from hydrogen sulfite and disulfite. The sulfurous compound described in this disclosure influence the reactivity of the foam mixture. If the amount of sulfurous compound is large the productivity may not be maintained and the catalyst level need to be adjusted (increase) to keep the foam rise profile similar to the standard mixture without the sulfurous compound. Thus, the sulfurs compounds of WO2008138482A1 are characterized by reducing aldehyde emanations but can be detrimental to foam reactivity beyond the recommended use level.

GB871291 relates to the production of polyester-urethane foam or cellular products which are hydrophilic and are capable of swelling in water and absorb large quantities of water. The disclosure provides a method of imparting hydrophilicity to polyester-polyurethane foam by introducing sulfonate and/or sulfonic acid groups which comprise treating a foamed polyester-urethane mass with an aqueous solution of an alkali metal sulfite or bisulfate at a temperature from room temperature to 100° C.

The previously described patents are hereby incorporated by reference.

BRIEF SUMMARY OF THE INVENTION

The instant invention relates to using sulfites and sulfite salts as catalysts, methods of using such sulfites for making polyurethane foams and to the resultant foams. Multiple problems are solved when using the sulfite salts of the invention as catalysts for making polyurethane polymers. Since the sulfite salts of the invention are able to replace amine catalysts from formulation the typical quality issues associated with the use of amines are eliminated. These quality issues that are solved by the use of the sulfite salts can comprise: PVC staining, window fogging, amine odor, foam ageing due to humidity and hot humidity, amine emissions as well as aldehyde emissions such as formaldehyde emissions, acetaldehyde emissions, acroleyn emissions as well as emissions form other aldehyde containing compounds. Other problems solved by the sulfite catalyst of the invention can include the partial or total replacement of toxic and/or emissive heavy metal compounds including transition and non-transition metal compounds and salts based on Sn, Hg, Pb, Bi, Zn, among other Group 12, 13, 14 and 15 as well as metals in Groups 3 to 12.

The present invention provides a new method to make polyurethane products utilizing sulfur based compounds and in particular sulfite salts. The sulfite salts of the invention are capable of acting as catalysts to accelerate the reaction between isocyanate containing compounds such as polyisocyanates and OH containing compounds such as polyols and water. The reaction rates are sufficiently high to not only provide polyurethane polymers but also polyurethane foam.

The sulfite salt catalysts of the invention also have several advantages over conventional metal salt catalysts and organometal salt catalysts made from transition metals as well as non-transition metals such as tin, mercury, lead, zinc, bismuth, iron, among other Group 12, 13, 14 and 15 as well as metals in Groups 3 to 12. Advantages include reduction or elimination of emissions from organic fragments such as carboxylic acids and other organic emissions typically observed when using metal salts and organo-metal salts from transition and non-transition metals.

One aspect of the invention relates to a catalyst composition comprising at least one sulfite and at least one other catalyst including tertiary amines, phase transfer catalysts and at least one metal catalyst.

Another aspect of the invention relates to the foregoing aspect wherein the sulfite comprises a compound having a structural formula of $M_2SO_3$ where M is a metal selected from Na, K, Li, Cs, Ca, Mg, Sr, and Ba.

Another aspect of the invention relates to any of the foregoing aspects wherein the sulfite comprises a quaternary ammonium sulfite salt where the quaternary ammonium ion is of the general formula $R^1R^2R^3R^4N$ where $R^1$, $R^2$, $R^3$, $R^4$ are $C_1$-$C_{36}$ alkyl, alkelnyl, aryl, alkylaryl, substituted alkyl, alkenyl or alkylaryl linear, branched with or without heterocyclic containing groups, with or without heteroatoms including nitrogen, oxygen, sulfur and halogen.

A further aspect of the invention relates to any of the foregoing aspects wherein the sulfite comprises at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite [$(Me_4N)_2SO_3$], tetraethylammonium sulfite [$(Et_4N)_2SO_3$], tetrabutylammonium sulfite [$(Bu_4N)_2SO_3$], trimethylbenzyl ammonium sulfite [$(Me_3N-CH_2-C_6H_5)_2SO_3$], cetyltrimethylammonium sulfite [$(Me_3N-(CH_2)_{14}-CH_3)_2SO_3$], N-methyl-pyridinium sulfite [$(Me-C_5NH_5)_2SO_3$], and di-alkylimidazolium sulfite salts [$(R_2C_3N_2H_3)_2SO_3$].

A further aspect of the invention relates to any of the foregoing aspects wherein the sulfite comprises mixed sulfite salts obtained when solutions of alkali metal sulfites are mixed with solutions of tetraalkylmmonium salts to produce mixed sulfite salts of general formula $(X'')_m(Y''')_n[SO_3]_{(m.n+n.m/2)}$ where X is a metal cation with charge n, Y is an alkylammonium or polyalkylammonium ion with charge m. n is an integer from 1 to 4; preferentially from 1 to 3, and m is an integer from 1 to 6; preferentially from 1 to 3. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

A further aspect of the invention relates to any of the foregoing aspects wherein the sulfite comprises mixed sulfite salts obtained when solutions of alkali metal sulfites are mixed with solutions of tetraalkylmmonium salts to produce mixed sulfite salts of general formula $[(X^n)]_{m.w}$ $[(Y^m)_{n.z}][SO_3]_{(m.n+n.m/2)}$ where X is a metal cation with charge n, Y is an alkylammonium or polyalkylammonium ion with charge m as described above and w and z are any positive real number defined such that w+z=2. n and m can be any integer ranging from 1 to 4 and preferentially 1 to 3. In some cases the mixed salts are not present in stoichiometric amounts. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

In one aspect of any of the foregoing aspects, the composition is substantially free of amines.

In any of the foregoing aspects the composition is substantially free of metal compounds based on Sn, Hg, Pb, Bi, and Zn.

In any of the foregoing aspects the invention relates to a composition comprising at least one sulfite catalyst and at least one polyol.

Another aspect of the invention relates to a process for producing polyurethane foam comprising contacting at least one polyol and at least one isocyante while in the presence of a catalyst comprising at least one sulfite.

A further aspect of the invention relates to a polyurethane foam made by any of the foregoing compositions or processes.

The various aspects of the invention can be used alone or in combination.

BRIEF DESCRIPTION OF SEVERAL VIEWS OF THE DRAWINGS

FIG. 1 is a graphical representation in terms of seconds v. mm of the rate of rise for foams made in accordance with Example 1.

FIG. 2 are photographs of foams made in accordance with Example 1.

FIG. 3 is a graphical representation in terms of seconds v. mm of the rate of rise for foams made in accordance with Example 2.

FIG. 4 are photographs of foams made in accordance with Example 2.

FIG. 5 is a graphical representation in terms of seconds v. mm of the rate of rise for foams made in accordance with Example 3.

FIG. 6 is a graphical representation in terms of seconds v. mm of foams made in accordance with Example 4.

FIG. 7 is a graphical representation in terms of seconds v. mm of the rate of rise for foams made in accordance with Example 8.

DETAILED DESCRIPTION OF THE INVENTION

The present invention relates to sulfites and sulfite salt catalysts. The inventive catalyst can have a structural formula of at least one of: i) $M_2SO_3$ where M is an alkali metal such as Na, K, Li, Cs, ii) $MSO_3$ where M is analkali earth metal such as Ca, Mg, Sr, Ba, and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkelnyl, aryl, alkylaryl, substituted alkyl, alkenyl or alkylaryl linear, branched with or without heterocyclic containing groups. The inventive catalyst comprises at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite $[(Me_4N)_2SO_3]$, tetraethylammonium sulfite $[(Et_4N)_2SO_3]$, tetrabutylammonium sulfite $[(Bu_4N)_2SO_3]$, trimethylbenzyl ammonium sulfite $[(Me_3N—CH_2—C_6H_5)_2SO_3]$, cetyltrimethylammonium sulfite $[(Me_3N—(CH_2)_{14}—CH_3)_2SO_3]$, N-methyl-pyridinium sulfite $[(Me—C_5NH_5)_2SO_3]$, and dialkylimidazolium sulfite salts $[(R_2C_3N_2H_3)_2SO_3]$.

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $(X^n)_m(Y^m)_n$ $[SO_3]_{(m.n+n.m/2)}$ where X is a metal cation with charge n, Y is an alkylammonium or polyalkylammonium ion with charge m. n is an integer from 1 to 4; preferentially from 1 to 3, and m is an integer from 1 to 6; preferentially from 1 to 3. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $[(X^n)_{m.w}][(Y^m)_{n.z}]$ $[SO_3]_{(m.n+n.m/2)}$ where X is a metal cation with charge n, Y is an alkylammonium or polyalkylammonium ion with charge m as described above and w and z are any positive real number defined such that w+z=2. n and m can be any integer ranging from 1 to 4 and preferentially 1 to 3. In some cases the mixed salts are not present in stoichiometric amounts. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

The present invention also provides methods to make polyurethane polymers. Catalysts are typically used when making polyurethane polymers in order to accelerate the reaction between OH groups (present in alcohols, polyols and water) and NCO groups (present in isocyanate and polyisocyanate compounds). These catalysts typically include members of the following groups: amine catalysts (for example organic compounds containing tertiary amine groups), metal catalysts which comprise metal salts and/or organo-metal salts of transition metals as well as non-transition metals such as Sn, Bi, Zn, Hg, Pb, Fe, etc) and/or alkali, alkali-earth or ammonium (such as tetralkyl ammonium) salts of organic oxo-compounds such as carboxylic acid, alcohols, phenols and the like.

The present invention provides a new method to make polyurethane products utilizing sulfite salts. The reaction rates obtained using the sulfite salts of the invention are sufficiently high to provide not only polyurethane polymers but also polyurethane polymer foam.

Multiple advantages are observed when making polyurethane polymers using the sulfite sals of the invention because many of the quality issues normally observed in finished products made with conventional tertiary amine as catalysts are eliminated. Some of the quality issues such as PVC staining, amine emissions, amine leaching when exposed to water and other liquids, amine odor, fogging, humid aged degradation as well as other degradative processes typically associated with amines are eliminated or minimized when using the sulfite salts of the invention. In addition, the sulfite salts can be used to fully or partially replace transition and non-transition metal catalysts salts such as carboxylate salts of Sn, Bi, Zn, Fe, Hg, Pb, etc. Metal and organo-metal salts from transition and non-transition metals commonly used as polyurethane catalysts are typically organic carboxylate salts that can lead to emissions of carboxylic acids and other organic fragments once the polymerization process is completed. These emissions can be eliminated or minimized when using the sulfite salts of the invention (e.g., amine emissions from a catalyst source, when measured in accordance with VDA-278, can eliminated). Further, the sulfite salts of the invention eliminate the need for the incorporation of toxic transition metal catalyst complexes such as Sn, Hg or Pb in polyurethane processes. Furthermore, the sulfite salts of the invention can reduce, if not eliminate, aldehyde emissions from materials for making polyurethanes as well as polyurethanes obtained from the invention. The inventive sulfite salts can function as aldehyde scavengers thereby converting at least one of the following aldehydes/ketones into their corresponding sulfite/bisulfite adducts: formaldehyde, acetaldehyde, acrolein, 2-propenal, propanal, 2-buterial,butyraldehyde, benzaldehyde, 3-methylbutanal, pentanal, o-tolualdehyde, m- and p-tolualdehyde, hexanal, 2,5-dimethylbenzaldehyde, cyclohexanone, glutaral, heptanal, octanal, nonanal, decanal.

In one aspect of the invention, the inventive sulfite salts are used as a solution of salts in at least one medium selected from the group consisting of water, ethylene glycol, diethylene glycol, polyethylene glycol, propylene glycol, dipropylene glycol, polypropylene glycol, 1,3-butanediol, 1,3-butanediol, 1,4-butanediol, 1,6-hexanediol, neopentyl glycol, pentaerythritol, glycerol, diglycerol, and trimethylol propane. The amount of medium can range from about 5 to 50, about 10 to about 35 and in some cases about 10 to 20 wt. % of the solution.

When using the sulfite salt catalysts of the invention the foam produced is characterized by a) reduced overall emissions as measured for example by the VDA 278 method because either all or most of the amine catalysts can be replace by non-volatile sulfite salt catalysts; b) excellent physical properties; c) minimal or no deterioration of other materials that can get in contact with the polyurethane polymer such as PVC or polycarbonate; d) low odor because sulfite salts have negligible vapor pressure compared to amine catalysts; e) partial of full elimination of toxic or harmful transition metal and organo-transition metal salts catalysts such as Sn, Bi, Pb, Hg, Zn, among others. Flexible molded foams characterized by excellent physical properties typically have target density (ASTM 3574-A) with range of about 28 to about 80 kg/m$^3$, air flow (ASTM 3574-G) with range of about 40 to about 120 L/M, ILDs (indentation load deflection method ASTM 3574-B1) with range of about 150 to about 600 N, support factor (ASTM 3574-B1) with range of about 2.5 to about 3.5, preferably about 3, and resilience (ASTM 3574-H) range of about 40 to about 80%. In one aspect of the invention a desirable foam has a Tensile/HA Tensile/Elongation/HA Elongation=DIN 53571—Range of about 80 to about 200%, a 50% Compression Set=ASTM D3574-D—Range of about 1 to about 20%, a HA Compression Set=ASTM D3574-J1 and J2—Range of about 5 to about 15%, and Tear=ASTM D3574-F—Range of about 150 to about 400.

The sulfite catalyst of the invention can be used with or without other amine gelling catalysts. The gelling catalysts can be conventional gelling like those having no isocyanate reactive groups in their molecular structure catalysts or they can be gelling catalysts having isocyante reactive groups in their molecular structure such as at least one of OH (alcohol), $NH_2$ (amine, amide, urea), =NH (amine, amide, urea), among others. The amine catalyst can also be acid blocked with an acid including carboxylic acids (alkyl, substituted alkyl, alkylene, aromatic, substituted aromatic) sulfonic acids or any other organic or inorganic acid. Examples of carboxylic acids include mono-acids, di-acids or poly-acids with or without isocyanate reactive groups. Examples of carboxylic acids include formic acid, acetic acid, propionic acid, butanoic acid, pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, myristic acid, pentadecanoic acid, hexadecanoic acid, heptadecanoic acid, octadecanoic acid, benzoic acid, oxalic acid, malonic acid, succinic acid, glutaric acid, adipic acid, pimelic acid, suberic acid, azelaic acid, sebacic acid, glycolic acid, lactic acid, tartaric acid, citric acid, malic acid, salicylic acid and the like.

The sulfite salt catalysts of the invention can be used with or without amine blowing catalysts such as at least one of bis(dimethylaminoethyl)ether, pentamethyldiethylene triamine, hexamethyltriethylenetetraamine, N,N,N'-trimethyl-N'-3-aminopropyl-bis(aminoethyl)ether or 2-[N-(dimethylaminoethoxyethyl)-N-methylamino]ethanol, among others.

Without wishing to be bound by any theory or explanation, it is believed that the inventive sulfite catalyst can interact with or bond to a polyol and an isocyanate to form a reaction product. The reaction product can be used in a wide range of applications that employ urethane chemistry including adhesives, coatings, foams, sealants, among other applications.

Further aspect of the invention relates to a process for making polyurethane foams by using the inventive catalysts and to the resultant foams. In particular, the instant invention relates to the use of sulfite salts to prepare polyurethane polymers including polyurethane foam polymers. The general advantages of using the sulfite salts of the invention to produce polyurethane polymers include: a) lower odor due to the ionic character and negligible vapor pressure of the sulfite salts relative to conventional amine catalysts; b) lower emissions due to the ionic character of the sulfite salts as well as their inability to release toxic vapors as compared to conventional amine catalysts and transition and organotransition carboxylate salts of Sn, Bi, Pb, Hg, etc; c) excellent physical properties; d) reduction or elimination of aldehyde emissions; e) no damage to other materials in contact with the polyurethane polymer such as PVC or polycarbonate; f) improved foam stability under hot and humid conditions. Flexible molded foams characterized by excellent physical properties typically have target density (ASTM 3574-A) with range of about 28 to about 80 kg/m$^3$, air flow (ASTM 3574-G) with range of about 40 to about 120 L/M, ILDs (indentation load deflection method ASTM 3574-B1) with range of about 150 to about 600 N, support factor (ASTM 3574-B1) with range of about 2.5 to about 3.5, preferably about 3, and resilience (ASTM 3574-H) range of about 40 to about 80%. In one aspect of the invention a desirable foam has a Tensile/HA Tensile/Elongation/HA Elongation=DIN 53571—Range of about 80 to about 200%, a 50% Compression Set=ASTM D3574-D—Range of about 1 to about 20%, a HA Compression Set=ASTM D3574-J1 and J2—Range of about 5 to about 15%, and Tear=ASTM D3574-F—Range of about 150 to about 400. Humid aged physical properties are measured after foam have been aged following the VW procedure: place samples to be tested in a dry oven at 90° C. for 24 hours for drying. Once dried, age samples for 200 hours @ 90° C. and 100% relative humidity. Samples are then dried after ageing in a dry oven at 70° C. for 22 hours. Samples are removed from drying oven and allowed to equilibrate at ambient conditions before measuring physical properties. Optimal humid aged physical properties for flexible molded foam are typically as follows: Humid Aged Tensile Strength≥70 Kpa (DIN 53571), 50% Humid Aged Compression Set (HACS)≤40% (ASTM 3574-D); Humid Aged Elongation≥70% (DIN 53571) and Humid Aged Load Loss (HALL) −40 to +30. Amine emissions in foam are measured using thermodesorption analysis and the substances emitted at 90° C. (VOC) and 120° C. (FOG) are quantified according to VDA 278 method. For this purpose a sample of the test material is conditioned to the corresponding temperature (90° C. from VOC and 120° C. for FOG) under the flow of inert gas, and the substances released are frozen out in the refrigerated injector of the gas chromatograph. The mixture is then passed through the gas chromatographic column and the total emissions quantified. The VOC and FOG are measured with the same sample. Quantification of the gaseous emissions (VOC) is made against an external toluene standard while the condensable emissions (FOG) are quantified against hexadecane ($C_{16}$-n-alkane). The concentrations are reported in ppm as total emissions in toluene and hexadecane equivalents. The sulfite salt catalysts used in the invention are crystalline ionic materials with no or negligible vapor pressure and consequently non-emissive.

Preparation of Plyurethane Foams

Flexible Foam: Flexible Molded Foam

Foams of any of the various types known in the art may be made using the methods of this invention, using typical polyurethane formulations to which have been added the appropriate amount of sulfite salt catalyst. For example, flexible polyurethane foams with the excellent characteristics described herein will typically comprise the components shown below in Table I, in the amounts indicated. The components shown in Table I will be discussed in detail later below.

TABLE I

| Polyurethane Components | |
|---|---|
| Component | Parts by Weight |
| Base Polyol | 20-100 |
| Polymer polyol | 0-80 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 60-115 |

The amount of polyisocyanate used in polyurethane formulations according to the invention is not limited, but it will typically be within those ranges known to those of skill in the art. An exemplary range is given in table I, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]*100

Flexible foams typically use copolymer polyols as part of the overall polyol content in the foam composition, along with base polyols of about 4000-5000 weight average molecular weight, a functionality number of 1 to 6 and more typically 2 to 4 and hydroxyl number of about 28-35. Base polyols and copolymer polyols will be described in detail later herein.

Catalysts

The present invention relates to sulfites and sulfite salt catalysts. The inventive catalyst can have a structural formula of at least one of: i) $M_2SO_3$ where M is an alkali metal such as Na, K, Li, Cs, ii) $MSO_3$ where M is analkali earth metal such as Ca, Mg, Sr, Ba, and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkelnyl, aryl, alkylaryl, substituted alkyl, alkenyl or alkylaryl linear, branched with or without heterocyclic containing groups. The inventive catalyst comprises at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite [$(Me_4N)_2SO_3$], tetraethylammonium sulfite [$(Et_4N)_2SO_3$], tetrabutylammonium sulfite [$(Bu_4N)_2SO_3$], trimethylbenzyl ammonium sulfite [$(Me_3N—CH_2—C_6H_5)_2SO_3$], cetyltrimethylammonium sulfite [$(Me_3N—(CH_2)_{14}—CH_3)_2SO_3$], N-methyl-pyridinium sulfite [$(Me—C_5NH_5)_2SO_3$], and dialkylimidazolium sulfite salts [$(R_2C_3N_2H_3)_2SO_3$].

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $(X''')_m(Y''')_n[SO_3]_{(m.n+n.m/2)}$ where X is a metal cation with charge n, Y is an alkylammonium or polyalkylammonium ion with charge m. n is an integer from 1 to 4; preferentially from 1 to 3, and m is an integer from 1 to 6; preferentially from 1 to 3. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

A further aspect of the invention relates to any of the foregoing aspects wherein the sulfite comprises mixed sulfite salts obtained when solutions of alkali metal sulfites are mixed with solutions of tetraalkylmmonium salts to give mixed sulfite salts of general formula $[(X^n)_{m.w}][(Y^m)_{n.z}][SO_3]_{(m.n+n.m/2)}$ where X is a metal cation with charge n, Y is an alkylammonium or polyalkylammonium ion with charge m as described above and w and z are any positive real number defined such that w+z=2. n and m can be any integer ranging from 1 to 4 and preferentially 1 to 3. In some cases the mixed salts are not present in stoichiometric amounts. Examples of X cations include but are not limited to $Li^+$, $Na^+$, $K^+$, $Cs^+$, $Be^{2+}$, $Mg^{2+}$, $Ca^{2+}$, $Zn^{2+}$, etc. Examples of Y cations include but are not limited to ammonium cations of general formula $R^1R^2R^3R^4N$ as defined above such as tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like.

The inventive catalyst can be manufactured by any suitable method such as passing $SO_2$ (sulfur dioxide) through an alkaline solution. The alkaline solution can be an alkali, alkali earth or quaternary ammonium hydroxide solution. Similarly, sulfite salts can be manufacture by reaction of $SO_2$ with alkali and alkali earth carbonate salts according to prior art procedures. Alternatively, some sulfite salts can be made by ion exchange for example between sodium sulfite and a metal chloride or a quaternary ammonium chloride. The sulfite salt can be used as aqueous solution or the sulfite salt can be dissovled in a glycol solvent such as ethylene glycol, propylene glycol, polyethylene glycol, polypropylene glcycol, MP-diol, glycerin, etc for applications where water needs to be minimized. Sulfite salts synthesis and manufacturing are described in a) "Sulfur Compounds" by Edward D Weil, Stanley R Sandler and Michael Gernon; Kirk Othmer Encyclopedia of Chemical Technology, 16 Jun. 2016, Section 13.1 and references therein; b) "Sulfites, Thiosulfates and Dithionites"; Jose Jimenez Barbera, Adolf Metzger, Manfred Wolf, Ullman's Encyclopedia of Industrial Chemistry pp. 695-704; 15 Jun. 2000 and references therein; the disclosure of which is hereby incorporated by reference.

The sulfite salt catalysts of the present invention can be used as the sole gelling catalyst but, in some cases, the sulfite salt catalysts can be used in the presence of other catalysts including at least one member selected from the group consisting of tertiary amine, transition metal catalysts, non-transition metal catalysts, organo-transition metal catalysts, organo-non-transition metal catalysts and carboxylate salts. Tertiary amine co-catalysts also include those containing isocyanate reactive groups such as primary amine, secondary amine, hydroxyl group, amide and urea. Examples of tertiary amine gelling having isocyanate reactive groups include N,N-bis(3-dimethylamino-propyl)-N-(2-hydroxypropyl)amine; N,N-dimethyl-N',N'-bis(2-hydroxypropyl)-1,3-propylenediamine;dimethylaminopropylamine (DMA-PA); N-methyl-N-2-hydroxypropyl-piperazine, bis-dimethylaminopropyl amine (POLYCAT® 15), dimethylaminopropyl urea and N,N'-bis(3-dimethylaminopropyl) urea (DABCO® NE1060, DABCO® NE1070, DABCO® NE1080 and DABCO® NE1082), 1,3-bis(dimethylamino)-2-propanol, 6-dimethylamino-1-hexanol, N-(3-aminopropyl)imidazole, N-(2-hydroxypropyl)imidazol, N,N'-bis(2-hydroxypropyl) piperazine, N-(2-hydroxypropyl)-morpholine, N-(2-hydroxyethylimidazole). Examples of tertiary amine blowing co-catalysts containing isocyanate reactive groups include 2-[N-(dimethylaminoethoxyethyl)-N-methylamino]ethanol (DABCO® NE200), N,N,N'-trimethyl-N'-3-aminopropyl-bis(aminoethyl)ether (DABCO® NE300). Other catalysts that can be used with the sulfite salts include metal catalysts such as transition metal and post-transition metals catalysts such as organotin compounds or bismuth carboxylates for example when the desired polyurethane foam is a flexible slab stock. Metal catalyst can also comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included.

In one aspect of the invention, sulfite catalyst are employed with at least one phase transfer catalyst. Examples of suitable phase transfer catalyst comprise at least one member selected from the group consisting of carboxylates, sulfonates, halide ions, sulfates of tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, triethylenediamine based quaternary ammonium such as N-methyl-triethylenediammoium and the like. While the sulfite salt catalysts of the instant invention can be used with amines listed above, such usage can increase emissions from foam during its useful lifetime as well as during foam manufacturing because either the vapor pressure of the amine catalyst itself is too high to be retained in the polyurethane foam or because the thermal stability of the chemical bonds formed between the isocyanate reactive tertiary amine and the isocyanate are not as stable when exposed to heat and/or humidity. Typically, the loading of the sulfite catalyst(s) for making foam according to the invention will be in the range of about 0.01 to about 20 pphp, more typically about 0.1 to about 10 pphp, and most typically about 0.1 to about 5 pphp. The term "pphp" means parts per hundred parts polyol. The amount of the other foregoing catalyst, if employed, will be in the range of about 0.01 pphp to about 20 pphp, more typically about 0.10 pphp to about 10 pphp and most typically about 0.10 pphp to about 5 pphp.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates. While any suitable isocyanate can be used, an example of such comprises isocyanate having an index range from about 20 to about 120 and typically from about 40 to 110 and more typically from about 90 to about 110. The amount of isocyanate typically ranges from about 95 to about 105.

Polyol Component

Polyurethanes are produced by the reaction of organic isocyanates with the hydroxyl groups of polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyether polyols also include those containing tertiary amine groups than can catalyze the gelling and the blowing reaction of polyurethanes, for example those described in U.S. Pat. No. 8,367,870; WO 03/016373 A1, WO 01/58976 A1; WO2004/060956 A1; WO03/016372 A1; and WO03/055930 A1; the disclosure of the foregoing WO publications is hereby incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures.

In addition to the base polyols described above, or instead of them, materials commonly referred to as "copolymer polyols" may be included in a polyol component for use according to the invention. Copolymer polyols may be used in polyurethane foams to increase the resistance to deformation, for example to improve the load-bearing properties. Depending upon the load-bearing requirements, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Other suitable polyols that can be used according to the invention include natural oil polyols or polyols obtained from renewable natural resources such as vegetable oils. Polyols useful in the preparation of polyurethane foam from inexpensive and renewable resources are highly desirable to minimize the depletion of fossil fuel and other non-sustainable resources. Natural oils consist of triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, transesterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination. Other suitable polyols include Mannich polyols. Mannich polyols are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols.

Open cell flexible molded foams typically use a main or "base" polyether polyol. Polyether polyols include poly (alkylene oxide) polymers such as poly(ethylene oxide) and poly(propylene oxide) polymers and copolymers with terminal hydroxyl groups derived from polyhydric compounds, including diols and triols. These polyols can have a functionality of about 2 to about 8, about 2 to about 6 and typically about 2 to about 4. The polyols can also have a hydroxyl number from about 10 to about 900, and typically about 15 to about 600 and more typically about 20 to about 50. Flexible molded foams also use copolymer polyols as part of the overall polyol content in the foam composition with OH numbers typically in the range of 15 to 50, MW ranges typically from 1200 to 8000 and more typically 2000 to 6000 and % solids form 10% to 60%. Open cell low density spray foam typically use a polyether polyol with an average MW from 1500 tp 6000 and OH number from 15 to 50.Polyols amounts are defined by pphp. There are 4 types of polyols above defined: standard polyol or polyether polyol which can be used in the range of about 100 pphp (the only polyol) to about 10 pphp. The copolymer polyol (CPP) can be used in the range of about 0 to about 80 pphp. The NOP (natural oil polyol) can be present from about 0 to about 40 pphp. Finally, the Mannich polyol is used in combination with other polyol and in a range from 0 pphp to 80 pphp, about 0 pphp to about 50 pphp and in some cases about 0 pphp to about 20 pphp.

Blowing Agents

Polyurethane foam production may be aided by the inclusion of a blowing agent (BA) to produce voids in the polyurethane matrix during polymerization. Any suitable blowing agent may be used. Suitable blowing agents include compounds with low boiling points which are vaporized during the exothermic polymerization reaction. Such blowing agents are generally inert or they have low reactivity and therefore it is likely that they will not decompose or react during the polymerization reaction. Examples of low reactivity blowing agents include, but are not limited to, carbon dioxide, chlorofluorocarbons (CFCs), hydrofluorocarbons (HFCs), hydrochlorofluorocarbons (HCFCs), fluoroolef ins (FOs), chlorofluoroolef ins (CFOs), hydrofluoroolefins (HFOs), hydrochlorfluoroolef ins (HCFOs), acetone, and low-boiling hydrocarbons such as cyclopentane, isopentane, n-pentane, and their mixtures. Other suitable blowing agents include compounds, for example water, that react with isocyanate compounds to produce a gas. The amount of BA is typically from about 0 (water blown) to about 80 pphp. Water (blow foam by reacting with isocyanate making $CO_2$) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, alkali and alkali earth carboxylate salts and combinations of any of these.

Cell stabilizers may include, for example, silicone surfactants as well as organic anionic, cationic, zwiterionic or nonionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof. Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

Cell stabilizers can be used in an amount from about 0.1 to about 20 pphp and typically from about 0.1 to about 10 pphp and, in some cases, from about 0.1 to about 5.0 pphp. Crosslinking agents can be used in an amount from about 0 pphp (no crosslinker) to about 20 pphp. Chain extenders can be used in an amount from about 0 pphp (no chain extender) to about 20 pphp. Fillers can be used in an amount from about 0 pphp (no fillers) to 40 pphp. Fire retardants can be used in an amount from about 0 to about 20 pphp and from about 0 to about 10 pphp and from about 0 to about 5 pphp.

In one aspect of the invention, the catalyst composition, foam manufacturing process and resultant foam are substantially free of amines. By "substantially free" it is meant that the foregoing contain less than about 10 pphp, typically less than about 5 pphp and in some cases 0 pphp of amines.

In another aspect of the invention, the catalyst, composition, foam manufacturing process and resultant foam are substantially free of toxic and/or emissive transition metal compounds based on Sn, Hg, Pb, Bi, Zn, among others. By "substantially free" it is meant that the foregoing contain less than about 10 pphp, typically less than about 5 pphp and in some cases 0 pphp of such metals.

In a further aspect of the invention, the catalyst, composition, foam manufacturing process and resultant foam are substantially free of amines and toxic and/or emissive transition metal compounds.

Certain aspects of the invention are illustrated by the following Examples. These Examples are illustrative only and shall not limit the scope of any claims appended hereto. Foams were evaluated by using Handmix Evaluations or Machine Evaluations as described below.

EXAMPLE 1

Illustration of Foam Kinetic Data Obtained with and without Tertiary Amine Gelling Catalyst Foaming performance can be evaluated by comparing the foam height versus time for standards and new amine catalyst. Foam height profile can be measured by automated rate of rise equipment, utilizing free-rise cup foam samples with a FOMAT sonar rate-of-rise device, model no V3.5 (hereafter referred to as a "ROR"). The FOMAT device comprises a sonar sensor that measures and records the height in millimeters (mm) of the rising foam sample versus time in seconds (s), directly after mixing all components of the formulation. The FOMAT standard software generates both height versus time plots and velocity versus time plots. These plots are useful for comparing the relative reactivity of different catalyst formulations. Flexible foam can be prepared by combining a total weight of about 300 g of the ingredients in Table 1 other than the isocyanate in a 32-oz (951 ml) paper cup. This premix formulation is then mixed in a plastic cup for about 10 seconds at about 6,000 rpm using an overhead stirrer fitted with a 2-inch (5.1 cm) diameter stirring paddle. Sufficient toluene diisocyanate is then added to achieve the desired Isocyanate Index of about 120, and the formulation is mixed well for about another 6 seconds at about 6,000 rpm using the same stirrer. The cup is then placed under the FOMAT sensor. The start time for ROR measurement is automated for the FOMAT and begins directly after the end of the final mixing. Once the cup is placed under the ROR, the chemical mixture begins to polymerize. Since the walls of the cup restrict the expansion in all but the vertical direction, this expansion manifests itself in this experiment as an increase in height in the y-axis with passing time in the x-axis as shown in FIG. 1. Table 1 shows the list of components needed to make flexible slabstock foam. Foam 1 contains 0.16 pphp of Dabco®T-9 (Stannous octoate) gelling catalysts. Foam 2 contains no Dabco®T-9 catalyst. The rate of rise profiles shown in FIG. 1 that when Dabco®-T9 is not present in the formulation then a large sight back is observed followed by collapse of the foaming mass. When Dabco®-T9 is present in the formulation then good quality foam is observed as shown in FIG. 2 below.

TABLE 1

| Component | Foam 1 Pphp | Foam 2 pphp |
|---|---|---|
| Voranol ®235-056[1] | 100.00 | 100.00 |
| Dabco DC5943[2] | 1.75 | 1.75 |
| Dabco ®BL11[3] | 0.18 | 0.18 |
| Dabco ®33LV[4] | 0.036 | 0.036 |
| Water | 5.40 | 5.40 |
| Methylene Chloride | 10 | 10 |
| Dabco ®T-9[5] | 0.16 | 0.00 |
| TDI | 71.6 | 71.6 |
| % NCO | 48.2 | 48.2 |
| Index | 120 | 120 |

[1]Voranol ®235-056: Polyether polyol with functionality f = 3 glycerin initiated with OH# = 56 and average MW = 3000 commercially available from Dow Chemicals.
[2]Dabco DC5943: Silicon surfactant with high efficiency for water blown polyether slabstock applications and commercially available from Air Products & Chemicals.
[3]Dabco ®33LV is a 33% solution of triethylene diamine in dipropylene glycol available from Air Products & Chemicals.
[4]Dabco ®T-9 is stannous octoate catalyst commercially available from Air Products and Chemicals

EXAMPLE 2

Illustration of Foam Kinetic Data Obtained when Using Aqueous Solution of Sodium Sulfite Flexible slabstock foam was prepared following the same procedure described for example 1. Table 2 shows the list of components needed to make flexible slabstock foam. Foam 1 was made according to a standard flexible slabstock formulation containing 0.16 pphp of Dabco®T-9 (Stannous octoate) as main gelling catalysts. Foam 2 does not contain Dabco®T-9 catalyst and it contains sodium sulfite as the main gelling catalyst. The sodium sulfite catalyst was added to the formulation as 15% solution in water. The rate of rise profiles in FIG. 3 shows that when Dabco®-T9 is completely replaced with 0.16 pphp of sodium sulfite added as 15% aqueous solution then the rate of rise curve for this foam exactly matched the rate of rise curve of the control formulation made with Dabco®-T9. Photographs of standard foam made with Dabco®T-9 and with sodium sulfite solution are shown in FIG. 4.

TABLE 2

| Component | Foam 1 Pphp | Foam 3 pphp |
|---|---|---|
| Voranol ®V235-056 | 100.00 | 100.00 |
| Dabco DC5943 | 1.75 | 1.75 |
| Dabco ®BL11 | 0.18 | 0.18 |
| Dabco ®33LV | 0.036 | 0.036 |
| Water | 5.40 | 5.40 |
| Methylene Chloride | 10 | 10 |
| Dabco ®T-9 | 0.16 | 0.00 |
| Sodium sulfite | 0.00 | 0.16 |
| TDI | 71.6 | 71.6 |
| % NCO | 48.2 | 48.2 |
| Index | 120 | 120 |

EXAMPLE 3

Illustration of Foam Kinetic Data Obtained when Using Aqueous Solution of Potassium Sulfite to Make TDI Molded Foam Free rise TDI based flexible molded foam samples were made following the same procedure described for example 1. Table 3 shows the list of components needed to make flexible molded foam samples like those commonly used in automotive car seating applications. Foam samples were made according to a standard flexible molded formulation containing reactive amines Dabco®NE1070 (mono- and bis-dimethylaminopropylurea) as main gelling catalysts and Dabco®NE300 (N,N,N'-trimethyl-N'-3-aminopropyl-bis (aminoethyl)ether) as main blowing catalyst. Table 4 shows the foam kinetic data comparison when tertiary amine gelling catalysts Dabco®NE1070 is replaced with potassium sulfite at various use levels. A faster string gel time is observed even at relatively low use levels of potassium of potassium sulfite relative to the standard demonstrating the effectiveness of potassium sulfite as polyurethane catalyst. FIG. 5 shows the rate of rise curves measure with FOMAT equipment as described in example 1.

TABLE 3

General TDI Flexible Molded Formulation

| Component | Pphp |
|---|---|
| Specflex ®NC630 Polyol[1] | 50 |
| Specflex ®NC700 Polyol[2] | 50 |
| Dabco DC6070[3] | 0.60 |
| Dabco ®NE300[4] | 0.17 |
| Dabco ®NE1070[4] | 0.70 |
| Water | 3.0 |
| Diethanolamine | 0.70 |
| TDI Index | 100 |

[1]High functionality capped polyether polyol of high molecular weight, functionality, and primary hydroxyl content with a base polyol molecular weight of about 5500, available from Dow Chemical Company, Midland, MI.
[2]Grafted polyether polyol containing copolymerized styrene and acrylonitrile, base polyol molecular weight about 4800, available from Dow Chemical Company, Midland, MI.
[3]Silicone surfactant is available from Air Products and Chemicals, Inc.
[4]The amine catalyst is available from Air Products and Chemicals, Inc.

TABLE 4

Foam Kinetic Data for Various Catalyst Combinations

| Foam | Gelling Catalyst | Gelling Catalyst (pphp) | Blow Catalyst | Blow Catalyst (pphp) | TOC[2] (sec) | SGT[2] (sec) |
|---|---|---|---|---|---|---|
| 4 | Dabco ®NE1070 | 0.70 | Dabco ®NE300 | 0.17 | 33 | 60 |
| 5 | $K_2SO_3$[1] | 0.30 | Dabco ®NE300 | 0.17 | 37 | 47 |
| 6 | $K_2SO_3$ | 0.20 | Dabco ®NE300 | 0.22 | 36 | 50 |
| 7 | $K_2SO_3$ | 0.20 | Dabco ®NE300 | 0.17 | 34 | 47 |

[1]Potassium sulfite was delivered in the formulation as a 20% solution in water.
[2]Useful comparisons can be made on the rate of the foaming reaction by recording the time required in seconds after mixing for the foaming mass to reach a standard height in the mixing cup (TOC = Top of the Cup). The string gel time (SGT) is the time in seconds at which the polymerizing mass is able to form polymer strings when touched with a wooden tongue suppressor.

EXAMPLE 4

Illustration of Foam Kinetic Data Obtained when Using Aqueous Solution of Potassium Sulfite to Make MDI Molded Foam Free rise MDI based flexible molded foam samples were made following the same procedure described for example 3. Table 5 shows the list of components needed to make MDI based flexible molded foam like those commonly used in automotive car seating applications. Foam samples were made according to a standard flexible molded formulation containing reactive amines Dabco®NE1070 (mono- and bis-dimethylaminopropylurea) as main gelling catalysts and Dabco®NE300 (N,N,N'-trimethyl-N'-3-aminopropyl-bis (aminoethyl)ether) as main blowing catalyst. Table 6 shows the foam kinetic data comparison when tertiary amine gelling catalysts Dabco®NE1070 is replaced with potassium sulfite at various use levels. String gel time (SGT) showed that even at relatively low use levels of potassium of potassium sulfite is a very effective polyurethane catalyst. FIG. 6 shows the rate of rise curves measure with FOMAT equipment as described in example 1.

TABLE 5

General MDI Flexible Molded Formulation

| Reagent | PPHP |
|---|---|
| Voranol ®CP-6001[1] | 100 |
| Dabco ®DC2525/[2] | 1.00 |
| Dabco ®DC1630[3] | |
| Voranol CP-1421[4] | 1.30 |
| Water | 3.49 |
| Dabco ®DEOA-LF[5] | 0.71 |
| Dabco ®NE1070[6] | 1.20 |
| Dabco ®NE300[7] | 0.20 |
| MDI (Rubinate ®7304) | 59.3 |
| MDI Index | 95 |
| % NCO | 32.6 |

[1]Voranol ®CP-6001: polyether polyol with functionality f = 3 especially developed for the production of flexible molded high resilience (HR) foam commercially available from Dow Chemicals.
[2]Dabco ®DC2525: Silicon surfactant designed for cold-cure MDI flexible molded foam for high performance HR systems where cell regulation is critical and commercially available from Air Products & Chemicals.
[3]Dabco ®DC1630: Silicon surfactant commercially available from Air Products & Chemicals.
[4]Voranol ®CP-1421 is a polyether polyol used as a cell opener in HR flexible molded foam commercially available from Dow Chemicals
[5]DABCO ®DEOA-LF is a solution of diethanolamine commercially available from Air Products & Chemicals.
[6-7]The amine catalyst is available from Air Products and Chemicals, Inc.

TABLE 6

Foam Kinetic Data for MDI Based Flexible Molded Foam with Various Catalyst Combinations

| Foam | Gelling Catalyst | Gelling Catalyst (pphp) | Blow Catalyst | Blow Catalyst (pphp) | TOC[2] | SGT[2] |
|---|---|---|---|---|---|---|
| 8 | Dabco ®NE1070 | 1.20 | Dabco ®NE300 | 0.20 | 37 | 55 |
| 9 | $K_2SO_3$[1] | 0.85 | Dabco ®NE300 | 0.25 | 39 | 53 |
| 10 | $K_2SO_3$ | 0.90 | Dabco ®NE300 | 0.22 | 41 | 54 |
| 11 | $K_2SO_3$ | 0.85 | Dabco ®NE300 | 0.27 | 36 | 48 |

[1] Potassium sulfite was delivered in the formulation as a 20% solution in water.
[2] TOC and SGT as defined above.

EXAMPLE 4

MDI and TDI Based Flexible Molded Foam Kinetic Data and Foam Physical Properties when Using Potassium Sulfite as Gelling Catalysts Flexible molded TDI based foam pad samples were made using the formulation described for example 3. Various use levels and combinations of potassium sulfite catalysts and Dabco®NE300 were tested to make foam pads with approximate densities in the range of 40 Kg/m3 and similar to those used in automotive car seating applications and compared with similar foam pads made with conventional catalyst Dabco®NE1070 and Dabco®NE300 commonly used in car seating applications.

TABLE 7

TDI Foam Kinetic Data from Mold for Various Catalyst Combinations

| Foam | Gelling Catalyst | Gelling Catalyst (pphp) | Blow Catalyst | Blow Catalyst (pphp) | EXT[2] (sec) | SGT[2] (sec) |
|---|---|---|---|---|---|---|
| 12 | Dabco ®NE1070 | 0.70 | Dabco ®NE300 | 0.17 | 43 | 59 |
| 13 | $K_2SO_3$[1] | 0.20 | Dabco ®NE300 | 0.22 | 47 | 59 |
| 14 | $K_2SO_3$ | 0.30 | Dabco ®NE300 | 0.17 | 49 | 59 |
| 15 | $K_2SO_3$ | 0.20 | Dabco ®NE300 | 0.27 | 44 | 54 |

[1] Potassium sulfite was deliverd in the formulation as a 20% solution in water.
[2] EXT is the time in seconds it takes the foaming mass to extrude from a mold isothermally controlled, heated aluminum mold maintained at 70 ± 2° C. The mold was a typical physical property tool designed with internal dimensions of 40.6 cm × 40.6 cm × 10.2 cm. The mold has five vents, each approximately 1.5 mm in diameter, centered in each corner 10.0 cm from each edge and the geometric center of the lid. The string gel time (SGT) is the time in seconds at which the polymerizing mass is able to form polymer strings when touched with a wooden tongue suppressor once the foam has extruded through one of the orifices of the mold.

Table 8 shows some representative physical properties of flexible molded foam foam pads for the $K_2SO_3$/Dabco®NE300 catalyst combination and its comparison with a standard amine base catalyst combination.

TABLE 8

Physical Properties of TDI Based Molded Foam

| Property | Unit | Method | Foam 12 (std) | Foam 13 | Foam 14 | Foam 15 |
|---|---|---|---|---|---|---|
| Density | Kg/m3 | ASTM D3574-A | 43 | 43 | 44 | 43 |
| Air Flow | SCFM | ASTM D3574-G | 3.8 | 3.3 | 3.4 | 3.1 |
| ILD 25% | N | ASTM D3574-B1 | 183 | 171 | 148 | 161 |
| ILD 65% | N | ASTM D3574-B1 | 475 | 453 | 427 | 443 |
| ILD 25% (Return) | N | ASTM D3574-B1 | 153 | 133 | 110 | 126 |
| Support Factor | Ratio | ASTM D3574-B1 | 2.6 | 2.6 | 2.8 | 2.7 |
| Resilience | % | ASTM D3574-H | 58 | 61 | 60 | 59 |
| Tensile Strenght | kPa | DIN 53571 | 141 | 114 | 121 | 119 |
| Tensile Elongation | % | DIN 53571 | 99 | 96 | 101 | 97 |
| Tear Strength | N/m | ASTM D3574-F | 288 | 277 | 269 | 270 |

Similarly, flexible molded MDI based foam pad samples were made using the formulation described for example 4. A combination of potassium sulfite catalyst and Dabco®NE300 were tested to make foam pads with approximate densities in the range of 55 Kg/m3 and similar to those used in automotive car seating applications and compared with similar foam pads made with conventional catalyst Dabco®NE1070 and Dabco®NE300 commonly used in car seating applications.

TABLE 9

MDI Foam Kinetic Data from Mold for Various Catalyst Combinations

| Foam | Gelling Catalyst (pphp) | Gelling Catalyst (pphp) | Blow Catalyst (pphp) | Blow Catalyst (pphp) |
|---|---|---|---|---|
| 16 | Dabco ®NE1070 | 1.20 | Dabco ®NE300 | 0.20 |
| 17 | $K_2SO_3$[1] | 0.85 | Dabco ®NE300 | 0.27 |

[1]Potassium sulfite was deliverd in the formulation as a 20% solution in water.

Table 10 shows some representative physical properties of flexible molded foam pads for the $K_2SO_3$/Dabco®NE300catalyst combination and its comparison with a standard amine base catalyst combination.

TABLE 10

Physical Properties of MDI Based Molded Foam

| MDI Flex Molded, Index 95 | | | | Foam 16 | Foam 17 |
|---|---|---|---|---|---|
| Test Description | Sample Aging | Test Method ID | Test Units | Standard Avg. | Sulfite Based Avg. |
| Core Density | Ambient | ASTM D3574-A | (kg/m3) | 49 | 49 |
| Section Density | Ambient | ASTM D3574-A | (kg/m3) | 57 | 55 |
| Air Flows | Ambient | ASTM D3574-G | SCFM | 1.4 | 1.4 |
| ILD 25% | Ambient | ASTM D3574-B1 | N | 264 | 280 |
| ILD 65% | Ambient | ASTM D3574-B1 | N | 653 | 820 |
| ILD 25% Return | Ambient | ASTM D3574-B1 | N | 200 | 200 |
| Support Factor | Ambient | ASTM D3574-B1 | ratio | 2.5 | 2.9 |
| Resilience | Ambient | ASTM D3574-H | % | 44 | 52 |
| HALLS (70% Preflex) | Volkswagen | ISO-3386-1 | % | −33 | −37 |
| Tensile Strength | Ambient | DIN 53571 | kPa | 132 | 107 |
| Tensile Elongation | Ambient | DIN 53571 | % | 86 | 80 |
| HA Tensile Strength | Volkswagen | DIN 53571 | kPa | 96 | 80 |
| HA Elongation | Volkswagen | DIN 53571 | % | 85 | 77 |
| Tear Strength | Ambient | ASTM D3574-F | N/m | 340 | 330 |
| 50% Comp. Sets | 70° C. dry oven | ASTM D3574-D | % | 12 | 19 |
| 50% HA Comp. Sets | Volkswagen | ASTM D3574-D | % | 37 | 39 |

EXAMPLE 5

Comparison of Foam Kinetic Data when Using Sodium Bisulfite

Table 11 shows the results when gelling catalysts Dabco®NE1070 is removed from the TDI flexible molded formulation shown in table 3 causing a severe delay in both TOC (top of the cup) and SGT (string gel time). Adding sodium bisulfite (sodium hydrogen sulfite) (0.72 g $NaHSO_3$) dissolved in a 20% water solution (3.6 pphp of 20% sodium bisulfite in water added) did not improve the SGT and caused further delay in the TOC suggesting some acid blocking of blowing catalysts Dabco®NE300. Adding 0.30 pphp $Na_2SO_3$ substantially accelerates string gel time indicating very good catalytic activity.

TABLE 11

No catalysis observed with $NaHSO_3$

| Foam | Catalyst | PPHP | Catalyst | PPHP | TOC | SGT |
|---|---|---|---|---|---|---|
| 18 | NE1070 | 0.70 | NE300 | 0.17 | 35 | 61 |
| 19 | NE1070 | 0.70 | NE300 | 0.17 | 37 | 61 |
| 20 | NONE | — | NE300 | 0.17 | 77 | 127 |
| 21 | NONE | — | NE300 | 0.17 | 75 | 127 |
| 22 | $NaHSO_3$ | 0.72 | NE300 | 0.17 | 94 | 127 |
| 23 | $NaHSO_3$ | 0.72 | NE300 | 0.17 | 95 | 127 |
| 24 | $Na_2SO_3$ | 0.30 | NE300 | 0.17 | 39 | 54 |

EXAMPLE 6

Reactivity of Amine Standard Catalysts in High Water Content (Low Density) Formulation Typically Used in Spray Applications The following formulation was used to make a low density water blown foam typically used in spray application using the conventional amine catalysts bis-(dimethylaminoethyl)-ether (BDMAEE) and dimethylaminoethoxy ethanol (DMAEE).

TABLE 12

Low Density Full Water Blown Foam Formulation

| Components | Amount (g) |
|---|---|
| Polyether Polyol: Poly-G ®-85-36 | 30.94 |
| Emulsifier (Nonylphenol ethoxylated): Tergitol ®NP-9 | 9.88 |
| Flame Retardant (TCPP) (Tris(2-trichloroisopropyl)phosphate: Fyrol ®PCF | 23.74 |
| Surfactant (Silicon surfactant): Tegostab ®B8870 | 1.05 |
| Cell Opener (Polybutadiene and/or polyoctenylene cell opener): Ortegol ®501 | 0.05 |
| DABCO ®BL-11: 70% Bis(dimethylaminoethyl)ether in dipropylene glycol | 2.64 |

TABLE 12-continued

Low Density Full Water Blown Foam Formulation

| Components | Amount (g) |
|---|---|
| DMAEE (Dimethylaminoethoxyethanol) | 1.12 |
| Water | 18.05 |
| MDI | 91.23 |

The above components were mixed and approximately 20 g of the above premix were mixed with 20 g of isocyanate (MDI) in a mechanical agitator in a 32 oz (~946.3 ml) litter plastic container. The time in seconds required for the foaming mass to reach the top of the cup was measured to be approximately 13.8 seconds when Standard-1 was used as the main blowing catalyst. Standard-1 is defined as mixture of 2.64 g Dabco®BL11 (70% bis(dimethylaminoethylether) in 30% dipropylene glycol) and 1.12 g of dimethylaminoethoxyethanol and it is the standard non-isocyanate reactive amine catalyst for the formulation shown in table 12.

EXAMPLE 7

Performance of Sulfite Catalysts in High Water Content (Low Density) Formulation Typically Used in Spray Applications The same formulation as the one used in example 6 was used to test a standard isocyanate-reactive amine catalyst made by mixing 75% bis(dimethylaminopropyl)amine and 25% N,N-dimethylaminoethyl-N'-methyl-N'-hydroxyethylamine as show in Table 13 for Standard-2 which gave a TOC of 15.1 seconds. Table 13 also shows that potassium sulfite was essentially inactive and consequently it was not possible to establish the TOC time in this case.

TABLE 13

Top of the Cup Time for Standards and Potassium Sulfite Catalyst

| Run# | Catalyst | Use Level (g) | TOC |
|---|---|---|---|
| 1 | Standard-1 | 3.76 | 13.8 |
| 3 | Standard-2 | 4.25 | 15.1 |
| 6 | $K_2SO_3$[1] | 4.51 | ND |

[1]Potassium sulfite was deliverd in the formulation as a 20% solution in water made at room tempreature. To the formulation of table 12 (excluding amine catalysts Dabco ®BL11 and BDMAEE) 4.51 g of potassium sulfite neat salt was added to the formulation as a 20% water solution in a maner as to satisfy a total amount of water according to the formulation of Table 12.

EXAMPLE 8

Performance of Sulfite Catalysts in High Water Content (Low Density) Formulation Typically Used in Spray Applications Table 14 below shows the results obtained when potassium sulfite dissolved in water is added together with organic salts added with the aim of improving the catalytic activity of sulfite salts. Common organic salts such as cetyltrimethylammonium chloride and sodium dodecylsulfate did not improve significantly the activity of sulfite catalyst. Better results were obtained when using tetrabutylammonium chloride also dissolved in water. The presence of 7 g of tetrabutylammonium chloride in the formulation helped to considerably accelerate the rate of foam formation as evidenced by the TOC time (~24 to 27 seconds).

TABLE 14

Top of the Cup Time Potassium Sulfite Catalyst in the Presence of Various Phase Transfer Catalysts

| Run# | Catalyst | Catalyst Use Level (g) | Phase Transfer Catalyst (PTC) | PTC Use Level (g) | TOC | Comments |
|---|---|---|---|---|---|---|
| 6 | $K_2SO_3$[1] | 4.51 | None | 0 | ND | |
| 7 | $K_2SO_3$[1] | 4.51 | CTMACl[2] | 4.90 | ND | 4.94 pphp of Tergitol ®NP9 |
| 8 | $K_2SO_3$[1] | 4.51 | CTMACl[2] | 6.0 | ND | 4.94 pphp of Tergitol ®NP9 |
| 9 | $K_2SO_3$[1] | 4.51 | CTMACl[2] | 9.9 | ND | No Tergitol ®NP9 added |
| 10 | $K_2SO_3$[1] | 4.51 | Na-DDBSA[3] | 4.51 | ND | |
| 11 | $K_2SO_3$[1] | 3.98 | $Bu_4NCl$[4] | 7.0 | 24.8 | |
| 12 | $K_2SO_3$[1] | 3.98 | $Bu_4NCl$[4] | 7.0 | 27.0 | |

[1]Potassium sulfite was deliverd in the formulation as a 20% solution in water made at room tempreature. To the formulation of table 12 (excluding amine catalysts Dabco ®BL11 and BDMAEE) 4.51 g of potassium sulfite neat salt was added to the formulation as a 20% water solution in a maner as to satisfy a total amount of water according to the formulation of Table 12.
[2]CTMACl is cetyltrimethylammonium chloride.
[3]Na-DDBSA is sodium dodecylbenzenesulfonate.
[4]$Bu_4NCl$ is tetrabutylammonium chloride.

EXAMPLE 9

Performance of Sulfite Catalysts in High Water Content (Low Density) Formulation Used in Spray Applications with Various Phase Transfer Catalysts FIG. 7 below shows the results obtained when potassium sulfite dissolved in water is added together with various organic alkylammonium salts added with the aim of improving the catalytic activity of sulfite salts. FIG. 7 shows the rise profile of Standard-1 as defined above and its comparison with a catalyst mixture in which Standard-1 was partially replaced with potassium sulfite in combination with various tetralkylammonium sulfites and for each case shown in FIG. 7 the molar ration of potassium sulfite to tetraalkylammonium salt was 1:1. Both tetrabutylammonium chloride and benzyltrimethylammonium chloride are effective phase transfer catalysts to enable sulfite salts catalysis.

EXAMPLE 10

Performance of Sulfite Catalysts in High Water Content (Low Density) Formulation Used in Spray Applications with Various Amine Catalysts Table 15 below shows the TOC (top of the cup as defined in example) results obtained when potassium sulfite dissolved in water is added together with benzyltrimethylammonium chloride and used in combination with tertiary amines with and without isocyanate reactive groups. The results showed that potassium sulfite aided by benzyltrimethylammonium chloride and used in combination with amines having isocyanate reactive groups can reach fast reaction rates comparable to the fully emissive standard. Thus, foams 4 and 5 in Table 15 were made without the use of BDAMEE-bis(dimethylaminoethyl)ether-an amine which has been associated with odor, emissions and blue haze.

tions acquired from SPEX industries, Inc. The calibration range for the analysis was 0.1 to 20 ppm.

Flexible molded foam made using the procedure described in example 4 (foam 15) was analyzed for sulfur content and compared with a standard foam sample made using the procedure described in example 4 with only amine catalysts (foam 12 in example 4). The result of the analysis are shown in Table 17 showing that flexible molded foam made with sulfite catalyst (Foam 2 in Table 17) contains a higher % of sulfur than conventional foam made with only amine catalysts (Foam-1 in Table 17).

Similarly, full water blown low density polyurethane foam typically used in spray foam applications made using the procedure described in example 6 was analyzed for sulfur content and compared with a standard foam sample made using the procedure described in example 6. The corresponding formulation are shown in Table 16:

TABLE 15

Potassium Sulfite Catalysts Used Together with Tertiary Amines With and Without Isocyanate-Reactive Groups

| Foam | Cat-1 | Cat-1 (g) | Cat-2 | Cat-2 (g) | Cat-3 | Cat-3 (g) | TAMS[1] | TAMS (g) | TOC | Coments |
|---|---|---|---|---|---|---|---|---|---|---|
| 1 | BL-11[2] | 2.64 | DMAEE[3] | 1.12 | — | — | — | — | 13.4 | Standard-1 |
| 2 | Std-2[4] | 4.25 | — | — | — | — | — | — | 15.2 | Standard-2 |
| 3 | BL-11 | 0.70 | Dabco ®-T[5] | 0.30 | $K_2SO_3$[6] | 4.20 | $BzMe_3NCl$[7] | 4.93 | 12.3 | RA and NRA[10] |
| 4 | Dabco ®-T | 2.97 | DMAEE[8] | 0.30 | $K_2SO_3$ | 4.20 | $BzMe_3NCl$ | 4.93 | 11.5 | RA[11] |
| 5 | BDMAPA-2HP[9] | 1.45 | Dabco ®-T | 0.17 | $K_2SO_3$ | 4.20 | $BzMe_3NCl$ | 4.93 | 15.6 | RA[11] |

[1]TAMS means tetraalkylammonium salt.
[2]BL-11 = Dabco ®BL11 is 70% bis(dimethylaminoethyl)ether in 30% dipropyleneglycol.
[3]DMAEE means dimethylaminoethoxy ethanol.
[4]Std-2 means standard-2 as defined in example 7 is 75% bis(dimethylaminopropyl)amine and 25% N,N-dimethylaminoethyl-N'-methyl-N'-hydroxyethylamine.
[5]Dabco ®-T is N,N-dimethylaminoethyl-N'-methyl-N'-2-(hydroxyethyl) amine.
[6]$K_2SO_3$ is potassium sulfite and the ammounts shown (4.2 g) correspond to the neat salt. The salt is dissolved in the corresponding amount of water according to formulation shown in Table 12.
[7]$BzMe_3NCl$ is benzyltrimethylammonium chloride and the use level shown of 4.93 g corresponds to the weight of the neat solvent (no solvent carrier). $BzMe_3NCl$ is mixed with the other components in solution using water as solvent in an amount according to the formulation shown in Table 12.
[8]DMAEE means dimethylaminoethoxyethanol.
[9]BDMAPA-2HP means bis-N,N-(dimethylaminopropyl)-N-(2-hydroxypropyl)-amine.
[10]RA and NRA means a mixture of isocyanate reactive and non-reactive amine was used with $K_2SO_3$.
[11]RA means that all amines used in conjunction with potassium sulfite are isocyanate reactive amines.

EXAMPLE 11

Determination of Sulfur Content in Polyurethane Foam

Sulfur analysis was determined using inductively coupled plasma optimal emission spectroscopy (ICP-OES). Samples of flexible molded polyurethane foam made in example 4 were placed in a Parr oxygen bomb combustion calorimeter. An aliquot was accurately weighted (~0.1 g) into a nickel cup and placed in a Monel® combustion bomb, 1 ml of ethanol (200 proof) was added to the cup as an accelerant. The absorbing solution analysis was 10 ml of a mixture of 32 mM sodium carbonate and 10 mM sodium bicarbonate. The bomb was pressurized with 30 atmospheres (atm) of oxygen to create a combustible atmosphere. The samples were transferred to a plastic beaker with water and acidified with nitric acid. The solution was then diluted by weight with deionized water. Sulfur was analyzed on a Perkin Elmer 5300DV inductively coupled plasma optical emission spectrometer. Calibration standards were made for stock solu-

TABLE 16

Low Density Full Water Blown Foam Formulation Used for Sulfur Analysis

| Components | Foam-1 | Foam-2 |
|---|---|---|
| Polyether Polyol: Poly-G ®-85-36 | 30.94 | 30.94 |
| Emulsifier (Nonylphenol ethoxylated): Tergitol ®NP-9 | 9.88 | 9.88 |
| Flame Retardant (TCPP) (Tris(2-trichloroisopropyl)phosphate: Fyrol ®PCF | 23.74 | 23.74 |
| Surfactant (Silicon surfactant): Tegostab ®B8870 | 1.05 | 0.70 |
| Cell Opener (Polybutadiene and/or polyoctenylene cell opener): Ortegol ®501 | 0.05 | 0.30 |
| Voranol ®-CP1421: polyether polyol triol available from Dow Chemical | — | 0.50 |
| DABCO ®BL-11: 70% Bis(dimethylaminoethyl)ether in dipropylene glycol | 2.64 | — |
| DMAEE (Dimethylaminoethoxyethanol) | 1.12 | — |
| 80% $BzMe_3NCl$ in water | — | 6.16 |
| 20% Potassium Sulfite in water | — | 21.00 |
| Dabco ®-T | — | 2.5 |

TABLE 16-continued

Low Density Full Water Blown Foam Formulation Used for Sulfur Analysis

| Components | Foam-1 | Foam-2 |
|---|---|---|
| Dimethylaminoethoxyethanol | — | 0.30 |
| Water | 18.05 | 0.02 |
| MDI | 87 | 96 |

The result of the analysis are shown in Table 16 showing that flexible molded foam made with sulfite catalyst contains a higher % of sulfur than conventional foam made with amine catalysts.

TABLE 17

Sulfur Content in Flexible Molded Foam

| Sample | Sulfur Content (Wt. %) |
|---|---|
| Foam-1: flexible molded foam made with only amine catalyst | 0.034[1] |
| Foam 2: flexible molded foam made with sulfite catalyst | 0.169[1] |

[1]Average of two tests

TABLE 18

Sulfur Content in High Water Low Density Foam

| Sample | Sulfur Content (Wt. %) |
|---|---|
| Foam-1 from Table 16 | ≤0.02[1] |
| Foam-2 from Table 16 | 0.461[1] |

[1]Average of three tests

The amount of sulfur in the foam can range from about 0.02 to about 0.6 wt. %, and typically about 0.03 to about 0.5 wt. %.

EXAMPLE 12

Reduction or Elimination of Aldehyde Emissions when Using Sulfite Salts Catalysts Foams for aldehyde testing were made in a conventional manner according to the methods known in the art using typical polyurethane formulations to which have been added a urethane catalyst comprising one or more tertiary alkyl amines. The amount of polyisocyanate used polyurethane formulations according to the invention is not limited, but it will typically be within those ranges known to those skilled in the art. Exemplary ranges are given in the table indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula:

NCO Index=[NCO/(OH+NH)]×100

Polyurethane foams were prepared and tested in a conventional manner using the formulation shown below:

Flexible Molded Formulation For Aldehyde Test

| Formulation component | mass |
|---|---|
| Polyol GEP828[1] (triol 6000) | 100 |
| Voranol ®CP1421[2] | 3 |
| DABCO ®DC2525[3] | 1 |
| DABCO ®DEOA-LF[4] | 0.9 |
| Added Water | 2.83 |
| DABCO@NE1070[5] | 1.1 |
| TMAPBAEE[6] | 0.2 |
| Desmodur ®MDI-3133[7] (32.5 NCO %) Index = 100 | 52.9 |
| Sodium Sulfite | 1.0 |

[1]Polyol GEP 828 is a standard polyether polyol supplied by Sinopec Shanghai Gaoqiao Company with an average functionality = 3 and approximate MW = 6000.
[2]Voranol ®CP1421 is a glycerol ethoxylated-propoxylated polyether polyol supplied by Dow Chemicals.
[3]DABCO ®DC2525 is a silicone surfactant stabilizer supplied by Air Products & Chemicals.
[4]DABCO ®DEOA-LF is a 85% solution of diethanolamine in water cross-linker supplied by Air Products & Chemicals.
[5]DABCO ®NE1070 is an amine catalysts composed of a mixture of mono- and bis (dimethylaminopropyl) urea supplied by Air Products & Chemicals.
[6]TMAPBAEE is N,N,N'-trimethyl-N'-3-aminopropyl-bis(aminoethyl) ether.
[7]Desmodur ®3133 is an isocyanate supplied by Bayer composed of a mixture of 4,4'-MDI, 2,4-MDI and PMDI with an average NCO content of approximately 32.5% by weight.

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Desmodur®MDI-3133 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold has five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements or allow to cool down to determine dimensional stability (detailed below).

Foam made with each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

The aldehyde emission on the foam pads produced as described above was done using the GM test method GMW 15635-2012 (GM). This involves placing the flexible foam sample of dimension 40 mm width×100 mm length on a hook hanging from the bottle cap of a PE bottle containing 50 mL of water. The foam is placed 40 mm from the water surface. The bottle containing the sample is heated for 3 h at 60° C. The aldehydes emitted are dissolved into the water and the concentration of each is determined by HPLC by comparison with known standards. The results are expressed in μg/g foam sample. This method is used for determining the aldehydes emitted from samples containing no scavenger (control) and with the added scavenger.

The results of aldehydes emission with control and scavengers are shown in Table 19.

TABLE 19

| Aldehyde Scavenger | Test Method: GMW 15635-2012 Method Detection Limit = 0.35 μg/g | | | |
|---|---|---|---|---|
| | scavenger Conc. (pphp) | Formaldehyde emission (μg/g) | Acetaldehyde emission (μg/g) | Acrolein Emissions (μg/g) |
| Control | — | 2.0 | 0.40 | <0.1 |
| Sodium Sulfite | 0.3 | <0.1 | <0.1 | <0.1 |

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for producing polyurethane consisting of contacting at least one polyol and at least one isocyanate while in the presence of A) a catalyst consisting of at least one sulfite, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite consists of at least one member selected from the group consisting of sodium sulfite ($Na_2SO_3$), potassium sulfite ($K_2SO_3$), lithium sulfite ($Li_2SO_3$), cesium sulfite ($Cs_2SO_3$), calcium sulfite ($CaSO_3$), magnesium sulfite ($MgSO_3$), tetramethylammonium sulfite [$(Me_4N)_2SO_3$], tetraethylammonium sulfite [$(Et_4N)_2SO_3$], tetrabutylammonium sulfite [$(Bu_4N)_2SO_3$], trimethylbenzyl ammonium sulfite [$(Me_3N-CH_2-C_6H_5)_2SO_3$], cetyltrimethylammonium sulfite [$(Me_3N-(CH_2)_{14}-CH_3)_2SO_3$], N-methyl-pyridinium sulfite [$(Me-C_5NH_5)_2SO_3$], and di-alkylimidazolium sulfite salts [$(R_2C_3N_2H_3)_2SO_3$], and wherein the amount of the at least one sulfite is about 0.1 to about 20 parts by weight per hundred parts by weight of the at least one polyol.

2. A process for producing polyurethane consisting of contacting at least one polyol and at least one isocyanate while in the presence of A) a gelling catalyst consisting of at least one sulfite and at least one blowing catalyst selected from the group consisting of 2-[N-(dimethylaminoethoxyethyl)-N-methylamino]ethanol, N, N, N'-trimethyl-N'-3-aminopropyl-bis(aminoethyl) ether, bis(dimethylaminoethyl)ether, pentamethyldiethylene triamine, and hexamethyltriethylenetetraamine, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite has a structural formula of at least one of : i) $M_2SO_3$ where M is an alkali metal selected from the group of Na, K, Li, Cs, ii) $MSO_3$ where M is an alkali earth metal selected from the group of Ca, Mg, Sr, Ba; and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkenyl, aryl, alkylaryl, substituted alkyl, alkenyl or alkylaryl linear, branched with or without heterocyclic containing groups, and wherein the amount of the at least one sulfite is about 0.1 to about 20 parts by weight per hundred parts by weight of the at least one polyol.

3. A process for producing polyurethane consisting of contacting at least one polyol and at least one isocyanate while in the presence of A) a catalyst composition consisting of i) a gelling catalyst consisting of at least one sulfite and ii) at least one tetralkylammonium phase transfer catalyst selected from the group consisting of carboxylates, sulfonates, halide ions, and sulfates of tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, and N-methyl-triethylenediammonium, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite has a structural formula of at least one of : i) $M_2SO_3$ where M is an alkali metal selected from the group of Na, K, Li, Cs, ii)$MSO_3$ where M is an alkali earth metal selected from the group of Ca, Mg, Sr, Ba; and iii) $M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkenyl, aryl, alkylaryl, substituted alkyl, alkenyl or alkylaryl linear, branched with or without heterocyclic containing groups, and wherein the amount of the at least one sulfite is about 0.1 to about 20 parts by weight per hundred parts by weight of the at least one polyol.

4. A process for producing polyurethane consisting of contacting at least one polyol and at least one isocyanate while in the presence of A) a catalyst composition consisting of i) a gelling catalyst consisting of at least one sulfite, ii) at least one blowing catalyst, and iii) at least one tetralkylammonium phase transfer catalyst, and B) at least one optional component selected from the group consisting of at least one cell stabilizer, at least one blowing agent, at least one crosslinking agent, at least one chain extender, at least one pigment, at least one filler, at least one flame retardant, at least one auxiliary urethane gelling catalyst, at least one auxiliary urethane blowing catalyst, at least one transition metal catalyst, at least one alkali carboxylate salt, at least one alkali earth carboxylate salt, or any combination thereof; wherein the sulfite has a structural formula of at least one of : i) $M_2SO_3$ where M is an alkali metal selected from the group of Na, K, Li, Cs, ii) $MSO_3$ where M is an alkali earth metal selected from the group of Ca, Mg, Sr, Ba; and iii)

$M_2SO_3$ where M is a quaternary ammonium ion of general formula $R^1R^2R^3R^4N$ where $R^1$, $R^2$, $R^3$, $R^4$ are $C_1$-$C_{18}$ alkyl, alkenyl, aryl, alkylaryl, substituted alkyl, alkenyl or alkylaryl linear, branched with or without heterocyclic containing groups; wherein the at least one blowing catalyst is selected from the group consisting of 2-[N-(dimethylaminoethoxyethyl)-N -methylamino]ethanol, N,N,N'-trimethyl-N'-3-aminopropyl-bis(aminoethyl) ether, bis(dimethylaminoethyl)ether, pentamethyldiethylene triamine, and hexamethyltriethylenetetraamine; wherein the at least one tetralkylammonium phase transfer catalyst is selected from the group consisting of carboxylates, sulfonates, halide ions, and sulfates of tetramethylammonium, tetraethylammonium, tetrapropylammonium, tetrabutylammonium, benzyltrimethylammonium, dibenzyldimethylammonium, tribenzylmethylammonium, tetrabenzylammonium, phenyltrimethylammonium, diphenyldimethylammonium, triphenylmethylammonium, tetraphenylammonium, dialkylimidazolium, and N-methyl-triethylenediammonium; and wherein the amount of the at least one sulfite is about 0.1 to about 20 parts by weight per hundred parts by weight of the at least one polyol.

\* \* \* \* \*

UNITED STATES PATENT AND TRADEMARK OFFICE
CERTIFICATE OF CORRECTION

PATENT NO. : 10,472,459 B2  
APPLICATION NO. : 14/881544  
DATED : November 12, 2019  
INVENTOR(S) : Juan Jesus Burdeniuc Page 1 of 1

It is certified that error appears in the above-identified patent and that said Letters Patent is hereby corrected as shown below:

On the Title Page

Item (54) and in the Specification, Column 1, Lines 1-2, should read:
POLYURETHANE CATALYSTS FROM SULFUR BASED SALTS Signed and Sealed this
Twenty-fourth Day of November, 2020

Andrei Iancu
*Director of the United States Patent and Trademark Office*